United States Patent
Yang

(10) Patent No.: US 7,995,358 B2
(45) Date of Patent: *Aug. 9, 2011

(54) CONTROL CIRCUIT INCLUDING ADAPTIVE BIAS FOR TRANSFORMER VOLTAGE DETECTION OF A POWER CONVERTER

(75) Inventor: Ta-Yung Yang, Milpitas, CA (US)

(73) Assignee: System General Corp., Taipei Hsien (TW)

( * ) Notice: Subject to any disclaimer, the term of this patent is extended or adjusted under 35 U.S.C. 154(b) by 161 days.

This patent is subject to a terminal disclaimer.

(21) Appl. No.: 11/337,582

(22) Filed: Jan. 24, 2006

(65) Prior Publication Data
US 2007/0171685 A1   Jul. 26, 2007

(51) Int. Cl.
*H02M 3/335* (2006.01)

(52) U.S. Cl. .................................... 363/21.12

(58) Field of Classification Search ............... 363/21.12, 363/21.13, 21.16, 21.17, 21.18
See application file for complete search history.

(56) References Cited

U.S. PATENT DOCUMENTS

| | | | | |
|---|---|---|---|---|
| 4,302,803 A | * | 11/1981 | Shelly | 363/20 |
| 6,381,151 B1 | * | 4/2002 | Jang | 363/21.01 |
| 6,836,415 B1 | * | 12/2004 | Yang et al. | 363/21.01 |
| 6,862,194 B2 | * | 3/2005 | Yang et al. | 363/16 |
| 7,016,204 B2 | * | 3/2006 | Yang et al. | 363/21.13 |
| 7,061,780 B2 | * | 6/2006 | Yang et al. | 363/21.16 |
| 7,274,575 B2 | * | 9/2007 | Ramabhadran et al. | 363/21.1 |
| 7,492,613 B2 | * | 2/2009 | Yang et al. | 363/21.01 |
| 2004/0257839 A1 | * | 12/2004 | Yang et al. | 363/21.12 |

* cited by examiner

*Primary Examiner* — Adolf Berhane
(74) *Attorney, Agent, or Firm* — Rosenberg, Klein & Lee

(57) ABSTRACT

A control circuit is developed to detect a flyback voltage of a transformer of a power converter. The control circuit comprises a switch, a detection circuit and a switching circuit. The switch is coupled to the transformer for switching the transformer. The detection circuit coupled the transformer to detect the flyback voltage for generating a first signal. The switching circuit generates a control signal to control the switch and regulate the output of the power converter in response to the first signal. Because the pulse width of the flyback voltage is short at light load, the detection circuit is designed to produce a bias signal to help the flyback voltage detection. The bias signal is increased in response to the decrease of the discharge time of the transformer. Besides, the switching circuit generates a blanking signal in response to the control signal. The blanking signal ensures a minimum pulse width of the flyback voltage.

15 Claims, 5 Drawing Sheets

US 7,995,358 B2

CONTROL CIRCUIT INCLUDING ADAPTIVE BIAS FOR TRANSFORMER VOLTAGE DETECTION OF A POWER CONVERTER

BACKGROUND OF THE INVENTION

1. Field of the Invention

The present invention relates to a power converter, and more specifically relates to a control circuit of the switching power converter.

2. Description of Related Art

Power converters have been widely used for providing regulated outputs. For safety, the power converter must provide the isolation between its primary side and secondary side. A transformer is usually equipped to provide the isolation and the energy transfer. FIG. 1 shows a power converter having a transformer 10. The energy is stored into the transformer 10 during a switch 20 is on, in which the switch 20 is a power transistor or a power MOSFET. The energy will be discharged to the output of the power converter when the switch 20 is switched off. A current-sense resistor 21 is connected in series with the switch 20 to sense the switching current of the transformer 10 and generate a current signal $V_S$ for the switching control. A voltage-detection terminal DET and a current-sense terminal VS of a controller 25 are respectively coupled to the transformer 10 and the current-sense resistor 21 to generate a control signal $V_G$ to control the on/off of the switch 20 and regulate the output of the power converter. A compensation terminal COM of the controller 25 connects a compensation capacitor 24.

The transformer 10 includes a primary winding $N_P$, a secondary winding $N_S$ and an auxiliary winding $N_{AUX}$. The secondary winding $N_S$ connects a rectifier 15. A filter capacitor 17 is coupled between the rectifier 15 and the secondary winding $N_S$. Once the switch 20 is turned off, the auxiliary winding $N_{AUX}$ will generate a flyback voltage $V_F$ correlated to the output voltage $V_O$. The flyback voltage $V_F$ can thus be utilized to feedback the output voltage $V_O$. A flyback control technique has been disclosed in U.S. Pat. No. 4,302,803 "Rectifier-Converter Power Supply with Multi-Channel Flyback Inverter", issued to Randolph D. W. Shelly. However, the disadvantage of the foregoing prior art is the flyback voltage cannot be accurately measured, particularly at the light load condition. FIG. 2 shows the waveforms of the power converter at light load. The discharge time $T_{DS}$ of the transformer 10 is given by, $$T_{DS} = \left(\frac{V_{IN}}{V_O + V_D}\right) \times \frac{W_{NS}}{W_{NP}} \times T_{ON} \quad (1)$$

where $V_{IN}$ is the input voltage of the power converter; $W_{NP}$ and $W_{NS}$ are respectively the winding turns of the primary winding $N_P$ and the secondary winding $N_S$ of the transformer 10; $V_D$ is a forward voltage drop of the rectifier 15; $T_{ON}$ is an on-time of the control signal $V_G$.

The flyback voltage $V_F$ is connected to the voltage-detection terminal DET of the controller 25 through a resistor 22. A parasitic capacitor 23 is coupled to the resistor 22. A detecting voltage $V_{DET}$ is therefore produced at the controller 25 for the flyback voltage detection. However the parasitic capacitor 23 and the resistor 22 cause a low pass filtering to the flyback voltage $V_F$. Besides the on-time $T_{ON}$ of the control signal $V_G$ and the discharge time $T_{DS}$ of the flyback voltage $V_F$ are short at light load, which causes the waveform distortion of the detecting voltage $V_{DET}$ shown in FIG. 2. A low flyback voltage is therefore detected. This drawback is the main object of the present invention to overcome.

SUMMARY OF THE INVENTION

A control circuit is developed to detect the flyback voltage of a transformer of the power converter and regulate the output of the power converter. The control circuit comprises a switch and a controller, in which the switch is coupled to the transformer to switch the transformer and transfer the energy from the primary side to the secondary side of the transform. The controller includes a detection circuit, a switching circuit and an adjust circuit. The detection circuit is coupled to the transformer to detect the flyback voltage of the transformer for generating a first signal and a second signal in accordance with the flyback voltage. The first signal is correlated to the output of the power converter. The second signal represents the discharge time of the transformer. The switching circuit is used for generating a control signal to control the switch and regulate the output of the power converter in response to the first signal. The adjust circuit is utilized to generate an adjust signal in response to the pulse width of the second signal. The detection circuit generates a bias signal transmitted to a voltage-detection terminal of the detection circuit to help the flyback voltage detection and prevent the waveform distortion. The bias signal is produced in proportional to the adjust signal. Besides, the switching circuit generates a blanking signal in response to the control signal. The blanking signal ensures a minimum on time of the control signal once the control signal is switched on. The minimum on time of the control signal produces a minimum pulse width of the flyback voltage, which further facilitates the flyback voltage detection.

It is to be understood that both the foregoing general descriptions and the following detailed descriptions are exemplary, and are intended to provide further explanation of the invention as claimed. Still further objects and advantages will become apparent from a consideration of the ensuing description and drawings.

BRIEF DESCRIPTION OF THE DRAWINGS

The accompanying drawings are included to provide further understanding of the invention, and are incorporated into and constitute a part of this specification. The drawings illustrate embodiments of the invention and, together with the description, serve to explain the principles of the invention.

DESCRIPTION OF THE PREFERRED EMBODIMENTS

Figure 1:
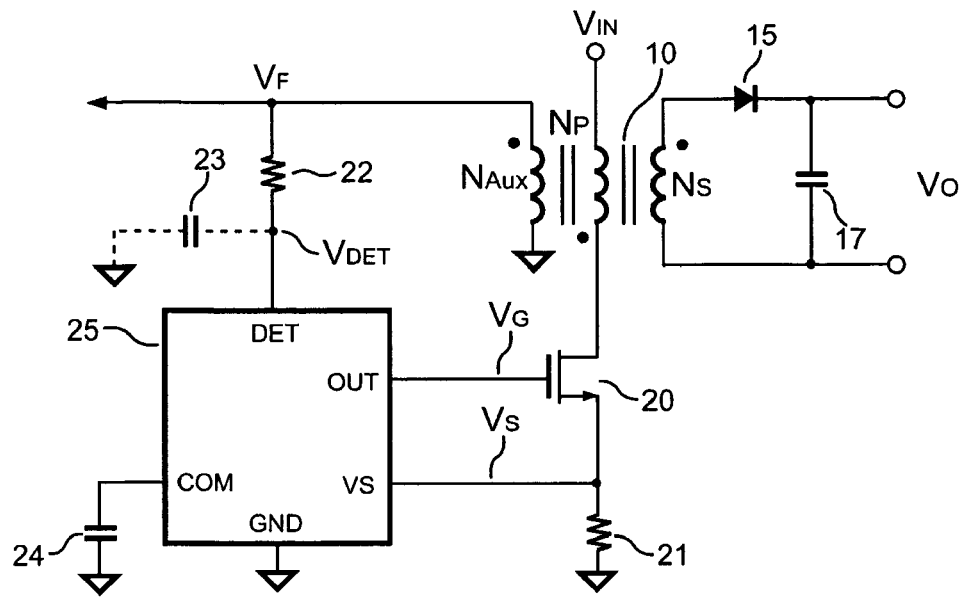
FIG. 1 shows a circuit diagram of a traditional power converter.
Figure 2:
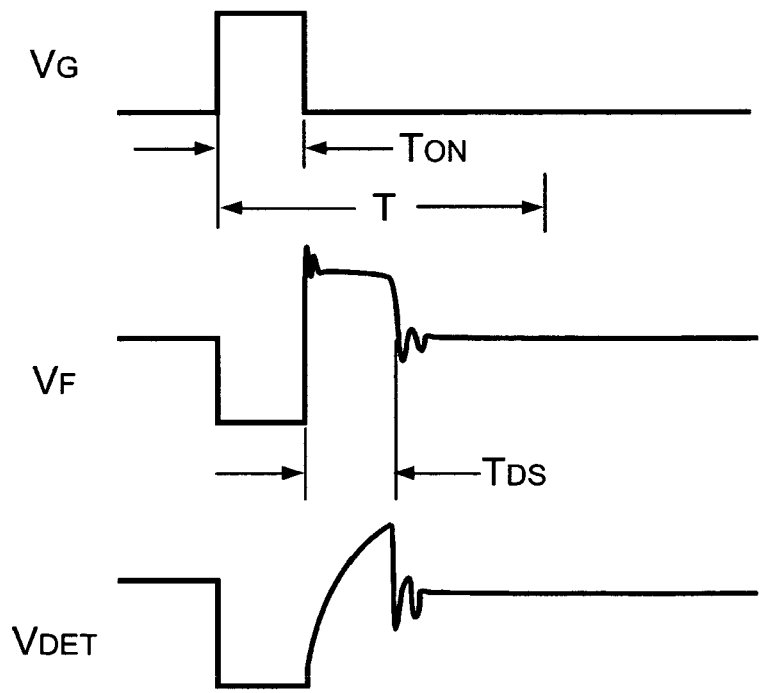
FIG. 2 shows the voltage waveforms of the traditional power converter at light load.
Figure 3:
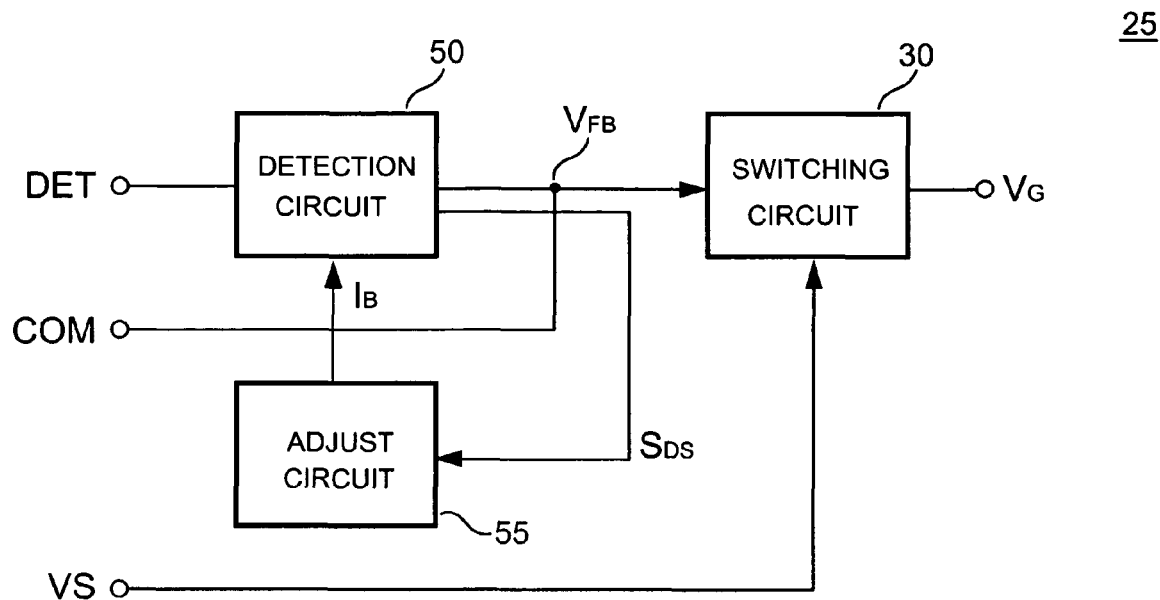
FIG. 3 shows a block diagram of a controller according to one embodiment of the present invention.

The control circuit of the power converter comprises the switch 20 and the controller 25. The controller 25 generates a control signal $V_G$ to control the switch 20 for switching the transformer 10. FIG. 3 shows a block diagram of the controller 25 according to one embodiment of the present invention. The controller 25 includes a switching circuit 30, a detection circuit 50 and an adjust circuit 55. The detection circuit 50 is coupled to the transformer 10 to detect the flyback voltage $V_F$ of the transformer 10 through the voltage-detection terminal DET for generating a first signal $V_{FB}$ and a second signal $S_{DS}$ in accordance with the flyback voltage $V_F$. The first signal $V_{FB}$ is correlated to the output voltage $V_O$ of the power converter. The second signal $S_{DS}$ represents the discharge time $T_{DS}$ of the transformer 10. The first signal $V_{FB}$ is transmitted to the compensation terminal COM. The switching circuit 30 generates a control signal $V_G$ to control the switch 20 and regulate the output of the power converter in response to the first signal $V_{FB}$. The adjust circuit 55 is coupled to the detection circuit 50 to generate an adjust signal $I_B$ in response to the second signal $S_{DS}$.

Figure 4:
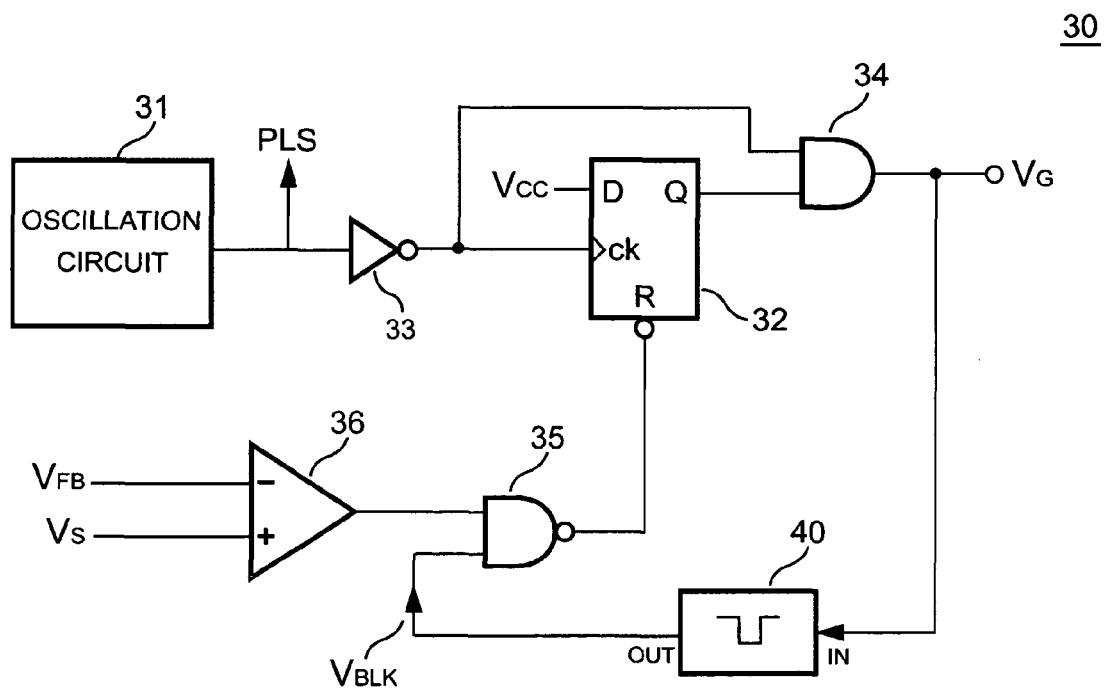
FIG. 4 shows a circuit diagram of a switching circuit according to one embodiment of the present invention.

The switching circuit 30 is shown in FIG. 4, in which an oscillation circuit 31 is utilized to produce a pulse signal PLS. The pulse signal PLS is a periodic pulse signal. The pulse signal PLS is transmitted to a flip-flop 32 through an inverter 33 to enable the control signal $V_G$. An input of the inverter 33 is coupled to an output of the oscillation circuit 31. An output of the inverter 33 is coupled to a clock input of the flip-flop 32. An output of the flip-flop 32 is connected to an input of an AND gate 34. Through the inverter 33, another input of the AND gate 34 is coupled to the oscillation circuit 31 to receive the pulse signal PLS to provide a maximum on time for the control signal $V_G$. An output of the AND gate 34 produces the control signal $V_G$. A comparator 36 is utilized to disable the flip-flop 32 through a NAND gate 35 once the current signal $V_S$ is higher than the first signal $V_{FB}$. A positive input and a negative input of the comparator 36 receive the current signal $V_S$ and the first signal $V_{FB}$ respectively. An output of the comparator 36 is connected to an input of the NAND gate 35. Another input of the NAND gate 35 is connected to an output terminal OUT of a blanking circuit 40 to receive a blanking signal $V_{BLK}$. An input terminal IN of the blanking circuit 40 receives the control signal $V_G$. An output of the NAND gate 35 is connected to a reset input of the flip-flop 32 to reset the flip-flop 32.

Figure 5:
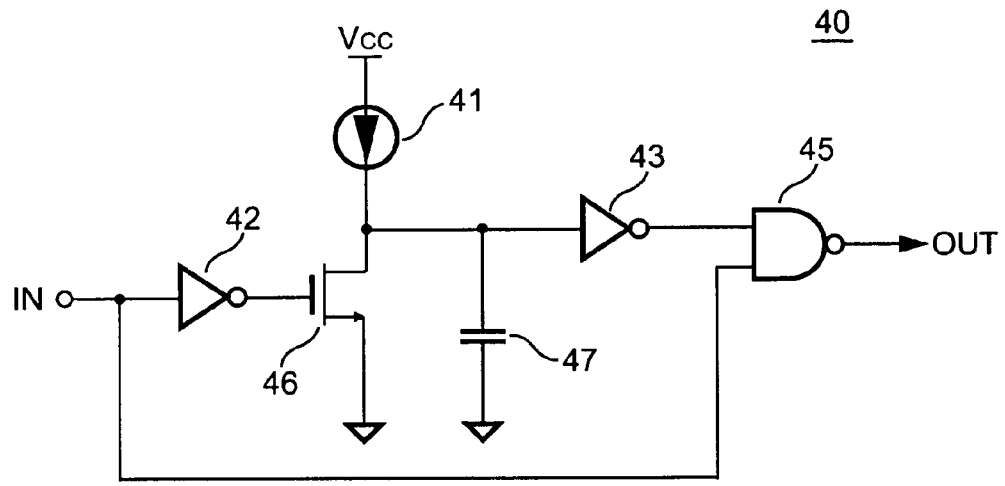
FIG. 5 shows a circuit diagram of a pulse generator of the switching circuit according to one embodiment of the present invention.

The blanking circuit 40 is a pulse generator that is shown in FIG. 5. An input of a inverter 42, which is also an input terminal IN of the pulse generator, receives a input signal. The input signal is the control signal $V_G$. An output of the inverter 42 is coupled to the gate of a transistor 46. Through the inverter 42, the input terminal IN of the pulse generator is coupled to the gate of the transistor 46 to turn off the transistor 46 when the input signal is enabled. The source of the transistor 46 is coupled a ground. A current source 41 is coupled between the drain of the transistor 46 and a supply voltage $V_{CC}$. A capacitor 47 is coupled between the current source 41 and the ground. The current source 41 will start to charge the capacitor 47 once the transistor 46 is off. The capacitor 47 is further connected to an NAND gate 45 via an inverter 43. An input of the inverter 43 is coupled to the capacitor 47. An output of the inverter 43 is coupled to an input of the NAND 45. Another input of the NAND 45 is connected to the input terminal IN of the pulse generator to receive the input signal. An output of the NAND 45, which is also an output terminal OUT of the pulse generator, outputs a pulse signal. The pulse signal is the blanking signal $V_{BLK}$. The current of the current source 41 and the capacitance of the capacitor 47 determine the pulse width of the pulse signal. Therefore the blanking circuit 40 generates the blanking signal $V_{BLK}$ in response to the enable of the control signal $V_G$. The blanking signal $V_{BLK}$ ensures a minimum on time of the control signal $V_G$ once the control signal $V_G$ is switched on. The minimum on time of the control signal $V_G$ further produces a minimum pulse width of the flyback voltage $V_F$, which facilitates the flyback voltage detection.

Figure 6:
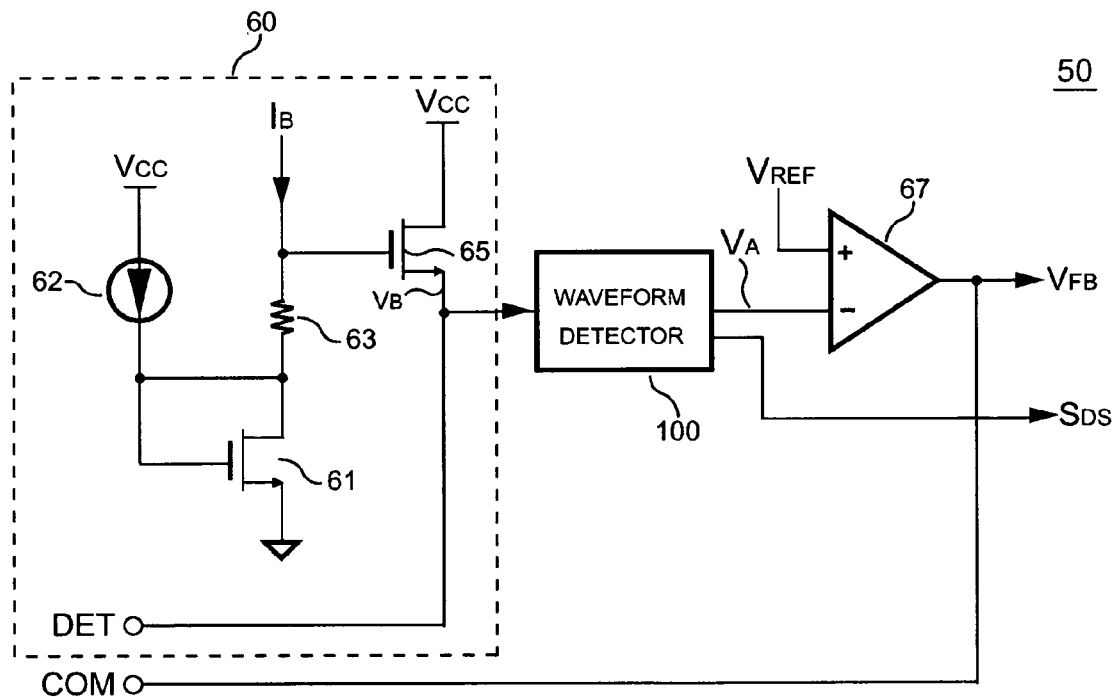
FIG. 6 shows a circuit diagram of a detection circuit according to one embodiment of the present invention.

FIG. 6 shows the detection circuit 50. The detection circuit 50 includes an error amplifier 67, a waveform detector 100 and a bias circuit 60. The bias circuit 60 generates a bias signal $V_B$ transmitted to the voltage-detection terminal DET of the detection circuit 50 to help the flyback voltage detection and prevent the waveform distortion of the detecting voltage $V_{DET}$. The bias signal $V_B$ is produced in proportional to the adjust signal $I_B$. The bias circuit 60 comprises a first transistor 65 having a source coupled to the voltage-detection terminal DET of the detection circuit 50 for generating the bias signal $V_B$. The drain of the first transistor 65 is coupled to the supply voltage $V_{CC}$. The gate of the first transistor 65 is coupled to a first resistor 63. The first resistor 63 is coupled to receive the adjust signal $I_B$ for generating a bias voltage at the gate of the first transistor 65. Therefore the bias signal $V_B$ is generated in proportional to the bias voltage. In order to compensate the gate-to-source voltage of the first transistor 65, a second transistor 61 is connected in series with the first resistor 63. The gate and the drain of the second transistor 61 are connected to the first resistor 63. The source of the second transistor 61 is connected to the ground. A current source 62 is further connected to the gate and the drain of the second transistor 61 to bias the second transistor 61.

In order to detect the flyback voltage $V_F$, the waveform detector 100 is coupled to the voltage-detection terminal DET to sense the flyback voltage $V_F$ for generating a sampled signal $V_A$ and the second signal $S_{DS}$ in accordance with the flyback voltage $V_F$. The error amplifier 67 having a positive input, which receives a reference voltage $V_{REF}$, generates the first signal $V_{FB}$ in response to the sampled signal $V_A$. The sampled signal $V_A$ is transmitted to a negative input of the error amplifier 67. An output of the error amplifier 67 outputs the first signal $V_{FB}$. The error amplifier 67 is a trans-conductance amplifier. The output of the error amplifier 67 is coupled to the compensation terminal COM of the controller 25. A compensation capacitor 24 is connected to the compensation terminal COM to provide frequency compensation to the error amplifier 67.

Figure 7:
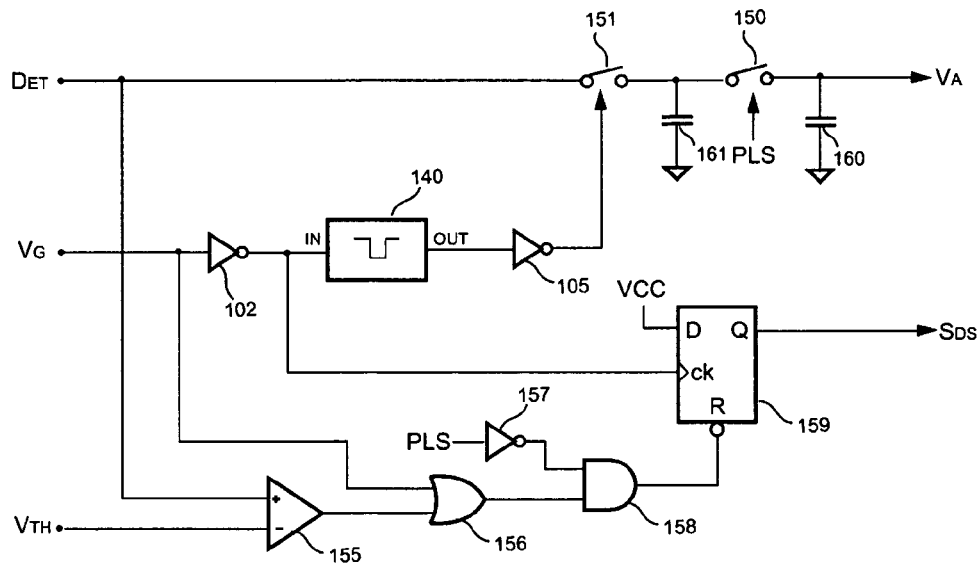
FIG. 7 shows a circuit diagram of a waveform detector of the detection circuit according to one embodiment of the present invention.

FIG. 7 shows a circuit diagram of the waveform detector 100. A first-sample switch 151 is coupled to the voltage-detection terminal DET of the detection circuit 50 for sampling the flyback voltage $V_F$. A first-sample capacitor 161 is connected between the first-sample switch 151 and the ground to hold the signal sampled by the first-sample switch 151. A second-sample switch 150 is coupled between the first-sample capacitor 161 and a second-sample capacitor 160 for periodically sampling the signal of the first-sample capacitor 161 to the second-sample capacitor 160. The second-sample switch 150 is turned on/off by the pulse signal PLS of the oscillation circuit 31. The on/off of the first-sample switch 151 is controlled by the control signal $V_G$. The control signal $V_G$ is transmitted to a pulse generator 140 through an inverter 102. An input of the inverter 102 receives the control signal $V_G$. An output of the inverter 102 is coupled to an input terminal IN of the pulse generator 140. An output terminal OUT of the pulse generator 140 generates a pulse signal coupled to control the first-sample switch 151 via an inverter 105. Therefore the flyback voltage $V_F$ is sampled in response to the off of the control signal $V_G$, and the sampled signal $V_A$ is produced on the second-sample capacitor 160 in accordance with the flyback voltage $V_F$.

A flip-flop 159 is connected to receive the control signal $V_G$ through the inverter 102 to generate the second signal $S_{DS}$ at an output of the flip-flop 159. A clock input of the flip-flop 159 is connected to receive the control signal $V_G$ to enable the second signal $S_{DS}$ in response to the disable of the control signal $V_G$. A comparator 155 having a positive input is coupled to the voltage-detection terminal DET of the detection circuit 50 for generating a reset signal by comparing the flyback voltage $V_F$ with a threshold voltage $V_{TH}$. The threshold voltage $V_{TH}$ is transmitted to a negative input of the comparator 155. The reset signal is used to reset the flip-flop 159 via an OR gate 156 and an AND gate 158. The second signal $S_{DS}$ is therefore disabled once the flyback voltage $V_F$ is lower than the threshold voltage $V_{TH}$. An output of the comparator 155 is connected to an input of the OR gate 156. Another input of the OR gate 156 is coupled to receive the control signal $V_G$. An output of the OR gate 156 is connected to an input of the AND gate 158. The pulse signal PLS is transmitted to another input of the AND gate 158 via an inverter 157. An input of the inverter 157 receives the pulse signal PLS. An output of the inverter 157 is coupled to the input of the AND gate 158. An output of the AND gate 158 is connected to a reset input of the flip-flop 159 to reset the flip-flop 159.

Figure 8:
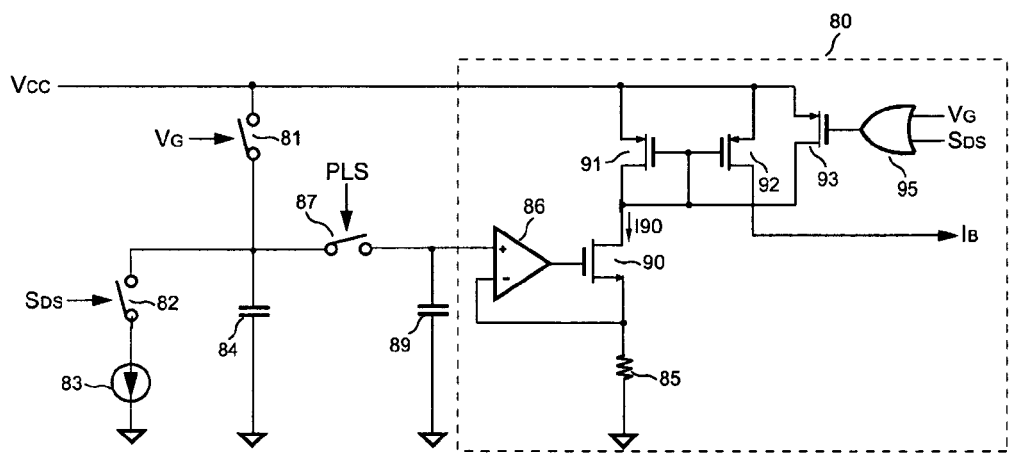
FIG. 8 shows a circuit diagram of a adjust circuit according to one embodiment of the present invention.

FIG. 8 shows the circuit diagram of the adjust circuit 55. A first terminal of a charge switch 81 is coupled to the supply voltage $V_{CC}$. A third-sample capacitor 84 is coupled between a second terminal of the charge switch 81 and the ground to charge the third-sample capacitor 84 to a preset value, such as the supply voltage $V_{CC}$. The charge switch 81 is controlled by the control signal $V_G$. Therefore the third-sample capacitor 84 is preset during the enable of the control signal $V_G$. A first terminal of a discharge switch 82 is coupled to the third-sample capacitor 84 to discharge the third-sample capacitor 84 in response to the enable of the second signal $S_{DS}$. Because a current source 83 is connected in serial with the discharge switch 82, the third-sample capacitor 84 is discharged through the current source 83. A third-sample switch 87 is coupled between the third-sample capacitor 84 and a fourth-sample capacitor 89. The third-sample switch 87 periodically samples the signal from the third-sample capacitor 84 to the fourth-sample capacitor 89 in response to the pulse signal PLS. A voltage-to-signal circuit 80 includes an amplifier 86, a second resistor 85, a third transistor 90 and a current mirror to generate the adjust signal $I_B$ in accordance with the signal on the fourth-sample capacitor 89. The current mirror includes a fourth transistor 91 and a fifth transistor 92. The amplifier 86 having a positive input is coupled to the fourth-sample capacitor 89. The second resistor 85 is connected from a negative input of the amplifier 86 to the ground. The gate of the third transistor 90 is coupled to an output of the amplifier 86 to generate a first current $I_{90}$ in response to the signal of the fourth-sample capacitor 89 and the resistance of the second resistor 85. The drain of the third transistor 90 generates the first current $I_{90}$. The source of the third transistor 90 is coupled to the negative input of the amplifier 86. The current mirror is used to generate the adjust signal $I_B$ in accordance with the first current $I_{90}$. The adjust signal $I_B$ is therefore generated in accordance with the pulse width of the control signal $V_G$. Besides, in order to save the power, a sixth transistor 93 is connected to current mirror to turn off the adjust signal in response to the enable of the control signal $V_G$. The sources of the transistors 91, 92, 93 are coupled to the supply voltage $V_{CC}$. The gates of the transistors 91, 92 and the drains of the transistors 90, 91, 93 are coupled together. The drain of the fifth transistor 92 generates the adjust signal $I_B$. The gate of the sixth transistor 93 is coupled to an output of an OR gate 95. A first input and a second input of the OR gate 95 receive the control signal $V_G$ and the second signal $S_{DS}$ respectively.

Figure 9:
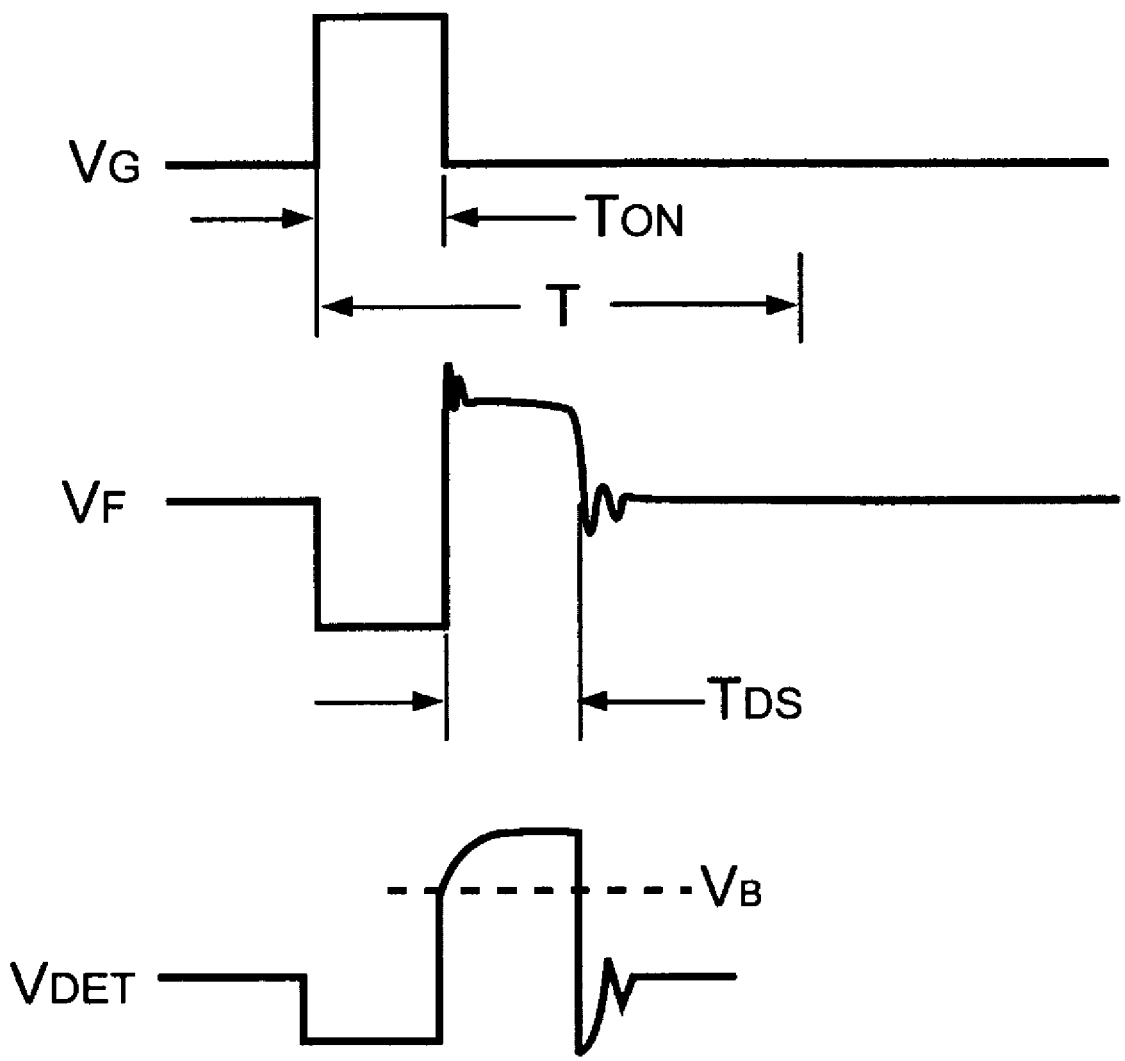
FIG. 9 shows the voltage waveforms of the power converter at light load according to one embodiment of the present invention.

FIG. 9 shows the voltage waveforms of the power converter at light load according to the present invention, in which the bias signal $V_B$ is added to the voltage-detection terminal DET. The detecting voltage $V_{DET}$ can be expressed as, $$V_{DET} = V_F \times (1 - e^{\frac{-t}{R \times C}}) + V_B \qquad (2)$$

$$t = R \times C \times \ln\left(\frac{V_F}{V_F - V_{DET} + V_B}\right) \qquad (3)$$

where R is the resistance of the resistor 22; C is the capacitance of the parasitic capacitor 23; t is the period for the detecting voltage $V_{DET}$ charge up to the flyback voltage $V_F$. By adding the bias signal $V_B$, the rising time of the detecting voltage $V_{DET}$ can be extremely reduced. Therefore the flyback voltage $V_F$ can be properly detected.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A control circuit of a power converter, comprising:
   a switch, coupled to a transformer of the power converter for switching the transformer;
   a detection circuit, coupled to the transformer to detect a flyback voltage of the transformer for generating a first signal and a second signal in accordance with the flyback voltage;
   a switching circuit, coupled to the detection circuit for generating a control signal to control the switch and regulate the output of the power converter in response to the first signal; and
   an adjust circuit, generating an adjust signal in response to the second signal;
   wherein the detection circuit generates a bias signal for the flyback voltage detection and preventing waveform distortion.

2. The control circuit as claimed in claim 1, wherein the switching circuit comprises a blanking circuit generating a blanking signal in response to the control signal, in which the blanking signal ensures a minimum on time of the control signal once the control signal is switched on.

3. The control circuit as claimed in claim 1, the detection circuit comprising:
   a bias circuit, coupled to the adjust circuit for generating the bias signal transmitted to a voltage-detection terminal of the detection circuit for the flyback voltage detection in response to the adjust signal, wherein the voltage-detection terminal is coupled to the transformer to detect the flyback voltage, in which the bias signal is produced in proportional to the adjust signal;

a waveform detector, coupled to the voltage-detection terminal to detect the flyback voltage for generating a sampled signal and the second signal in accordance with the flyback voltage; and an error amplifier, having a reference voltage and receiving the sampled signal for generating the first signal in response to the sampled signal.

4. The control circuit as claimed in claim 3, the bias circuit comprising:

a first transistor, coupled to the voltage-detection terminal of the detection circuit to provide the bias signal; and a first resistor, coupled to the adjust circuit to receive the adjust signal for generating a bias voltage to control the first transistor;

wherein the bias signal is generated in proportional to the bias voltage.

5. The control circuit as claimed in claim 3, the waveform detector comprising:

a first-sample switch, coupled to the voltage-detection terminal of the detection circuit for sampling the flyback voltage;

a first-sample capacitor, connected to the first-sample switch to hold a signal sampled by the first-sample switch;

a second-sample capacitor;

a second-sample switch, coupled between the first-sample capacitor and the second-sample capacitor for periodically sampling the signal of the first-sample capacitor to the second-sample capacitor; wherein the second-sample capacitor produces the sampled signal in accordance with the flyback voltage;

a flip-flop, coupled to receive the control signal to generate the second signal, wherein the second signal is enabled in response to the disable of the control signal; and;

a comparator, coupled to the voltage-detection terminal of the detection circuit for generating a reset signal by comparing the flyback voltage with a threshold voltage, in which the reset signal is transmitted to the flip-flop to disable the second signal.

6. The control circuit as claimed in claim 1, the adjust circuit comprising:

a charge-switch, coupled to a supply voltage, wherein the charge-switch is turned on/off by the control signal;

a third-sample capacitor, coupled to the charge-switch to charge the third-sample capacitor to a preset value in response to the enable of the control signal;

a current source;

a discharge-switch, coupled between the current source and the third-sample capacitor to discharge the third-sample capacitor in response to the enable of the second signal, in which the third-sample capacitor is discharged through the current source;

a fourth-sample capacitor;

a third-sample switch, coupled between the third-sample capacitor and the fourth-sample capacitor for periodically sampling the signal from the third-sample capacitor to the fourth-sample capacitor; and a voltage-to-signal circuit, coupled to the fourth-sample capacitor for generating the adjust signal in accordance with the signal of the fourth-sample capacitor.

7. The control circuit as claimed in claim 6, the voltage-to-signal circuit comprising:

a first amplifier, having a positive input coupled to the fourth-sample capacitor;

a second resistor, connected from a negative input of the first amplifier to the ground;

a third transistor, coupled to an output of the first amplifier and the negative of the first amplifier to generate a first current in response to the signal of the fourth-sample capacitor and the resistance of the second resistor; and a current mirror, coupled to the third transistor to generate the adjust signal in accordance with the first current.

8. A control circuit of a power converter, comprising:

a switch, coupled to a transformer of the power converter for switching the transformer;

a detection circuit, coupled to the transformer to detect a flyback voltage of the transformer for generating a first signal; and a switching circuit, coupled to the detection circuit for generating a control signal to control the switch in response to the first signal;

wherein the detection circuit generates a bias signal for the flyback voltage detection and preventing waveform distortion.

9. The control circuit as claimed in claim 8, wherein the switching circuit further comprises a blanking circuit generating a blanking signal in response to the control signal, in which the blanking signal ensures a minimum on time of the control signal once the control signal is switched on.

10. The control circuit as claimed in claim 8, the detection circuit comprising:

a bias circuit, generating the bias signal transmitted to a voltage-detection terminal of the detection circuit for the flyback voltage detection, wherein the voltage-detection terminal is coupled to the transformer to detect the flyback voltage;

a waveform detector, coupled to the voltage-detection terminal to detect the flyback voltage for generating a sampled signal and a second signal in accordance with the flyback voltage; and an error amplifier, having a reference voltage and receiving the sampled signal for generating the first signal in response to the sampled signal.

11. The control circuit as claimed in claim 10, the bias circuit comprising:

a first transistor, coupled to the voltage-detection terminal of the detection circuit to provide the bias signal; and a first resistor, receiving a adjust signal for generating a bias voltage to control the first transistor, in which the adjust signal is produced in response to the second signal;

wherein the bias signal is generated in proportional to the bias voltage.

12. The control circuit as claimed in claim 10, the waveform detector comprising:

a first-sample switch, coupled to the voltage-detection terminal of the detection circuit for sampling the flyback voltage;

a first-sample capacitor, connected to the first-sample switch to hold a signal sampled by the first-sample switch;

a second-sample capacitor;

a second-sample switch, coupled between the first-sample capacitor and the second-sample capacitor for periodically sampling the signal of the first-sample capacitor to the second-sample capacitor; wherein the second-sample capacitor produces the sampled signal in accordance with the flyback voltage;

a flip-flop, coupled to receive the control signal to generate the second signal, wherein the second signal is enabled in response to the disable of the control signal; and a comparator, coupled to the voltage-detection terminal of the detection circuit for generating a reset signal by comparing the flyback voltage with a threshold voltage, in which the reset signal is transmitted to the flip-flop to disable the second signal.

13. The control circuit as claimed in claim 8, further comprising, an adjust circuit to generate an adjust signal in response to a second signal generated by the detection circuit in accordance with the flyback voltage of the transformer, in which the adjust signal is transmitted to the detection circuit to generate the bias signal.

14. The control circuit as claimed in claim 13, the adjust circuit comprising:
   a charge-switch, coupled to a supply voltage, wherein the charge-switch is turned on/off by the control signal;
   a third-sample capacitor, coupled to the charge-switch to charge the third-sample capacitor to a preset value in response to the enable of the control signal;
   a current source;
   a discharge-switch, coupled between the current source and the third-sample capacitor to discharge the third-sample capacitor in response to the enable of the second signal, in which the third-sample capacitor is discharged through the current source;
   a fourth-sample capacitor;
   a third-sample switch, coupled between the third-sample capacitor and the fourth-sample capacitor for periodically sampling the signal from the third-sample capacitor to the fourth-sample capacitor; and
   a voltage-to-signal circuit, coupled to the fourth-sample capacitor for generating the adjust signal in accordance with the signal of the fourth-sample capacitor.

15. The control circuit as claimed in claim 14, the voltage-to-signal circuit comprising:
   a first amplifier, having a positive input coupled to the fourth-sample capacitor;
   a second resistor, connected from a negative input of the first amplifier to the ground;
   a third transistor, coupled to an output of the first amplifier and the negative of the first amplifier to generate a first current in response to the signal of the fourth-sample capacitor and the resistance of the second resistor; and
   a current mirror, coupled to the third transistor to generate the adjust signal in accordance with the first current.

* * * * *